United States Patent
Francis et al.

(10) Patent No.: US 12,415,381 B2
(45) Date of Patent: Sep. 16, 2025

(54) HEAT SHIELD RETAINERS AND BUMPER STANDOFFS FOR HEAT SHIELD RETAINERS

(71) Applicant: Goodrich Corporation, Charlotte, NC (US)

(72) Inventors: Brian P. Francis, Russia, OH (US); Marcin Szymon Sokołowski, Wojsławice-Kolonia (PL); Bartłomiej Kamil Żuk, Legnica (PL)

(73) Assignee: Goodrich Corporation, Charlotte, NC (US)

( * ) Notice: Subject to any disclaimer, the term of this patent is extended or adjusted under 35 U.S.C. 154(b) by 547 days.

(21) Appl. No.: 17/846,800

(22) Filed: Jun. 22, 2022

(65) Prior Publication Data
US 2023/0415508 A1 Dec. 28, 2023

(51) Int. Cl.
*B60B 21/12* (2006.01)
*B64C 25/36* (2006.01)
(Continued)

(52) U.S. Cl.
CPC .............. *B60B 21/12* (2013.01); *B64C 25/36* (2013.01); *B60B 2320/50* (2013.01);
(Continued)

(58) Field of Classification Search
CPC .... F16D 2065/785; F16D 55/36; F16D 65/78; F16D 65/847; B60B 21/12;
(Continued)

(56) References Cited

U.S. PATENT DOCUMENTS

| 4,084,857 | A |   | 4/1978 | VanderVeen |
| 5,248,013 | A | * | 9/1993 | Hogue ................... F16D 55/36 |
|   |   |   |   | 188/264 G |

(Continued)

FOREIGN PATENT DOCUMENTS

| EP |   | 0811511 |   | 12/1997 |   |
| EP |   | 2687742 | A1 * | 1/2014 | ............. F16D 55/36 |

(Continued)

OTHER PUBLICATIONS

European Patent Office, European Search Report dated Oct. 13, 2023 in Application No. 23176471.3.
(Continued)

*Primary Examiner* — S. Joseph Morano
*Assistant Examiner* — Eva L Comino
(74) *Attorney, Agent, or Firm* — SNELL & WILMER L.L.P.

(57) ABSTRACT

A heat shield for a wheel assembly may comprise a plurality of heat shield segments, a plurality of shield bumpers may be coupled to a radially outward surface of each heat shield segment, and a plurality of heat shield retainers coupled to the plurality of heat shield segments. Each heat shield retainer may include a first bumper standoff and a second bumper standoff located over a first radially outward surface of the heat shield retainer. Each of the first bumper standoff and the second bumper standoff may comprise an attachment portion coupled to the first radially outward surface of the heat shield retainer and a bumper portion defining a bumper opening.

20 Claims, 7 Drawing Sheets

(51) Int. Cl.
*F16D 65/78* (2006.01)
*F16D 65/847* (2006.01)

(52) U.S. Cl.
CPC ... *B60B 2900/212* (2013.01); *B60B 2900/513* (2013.01); *F16D 2065/785* (2013.01); *F16D 65/847* (2013.01)

(58) Field of Classification Search
CPC .......... B60B 2320/50; B60B 2900/212; B60B 2900/513; B64C 25/36; B60C 23/19
USPC ........................................................ 301/6.3
See application file for complete search history.

(56) References Cited

U.S. PATENT DOCUMENTS

| | | | | |
|---|---|---|---|---|
| 5,851,056 | A * | 12/1998 | Hyde | B60B 19/10 188/264 G |
| 7,051,845 | B2 * | 5/2006 | Thorp | F16D 65/78 188/71.6 |
| 7,546,910 | B2 * | 6/2009 | Thorp | F16D 55/36 188/71.6 |
| 8,523,108 | B2 * | 9/2013 | Coty | F16D 55/40 188/71.6 |
| 11,274,715 | B2 | 3/2022 | Miller et al. | |
| 2015/0308758 | A1 * | 10/2015 | Houser | F16D 55/36 165/67 |
| 2017/0106973 | A1 * | 4/2017 | Baden | B64C 25/36 |
| 2020/0141461 | A1 * | 5/2020 | Brodard | B64C 25/42 |
| 2020/0300320 | A1 | 9/2020 | Francis | |
| 2021/0018055 | A1 * | 1/2021 | Miller | F16D 55/36 |
| 2021/0181691 | A1 * | 6/2021 | Rothkopf | G06F 3/015 |
| 2022/0176759 | A1 | 6/2022 | Miller et al. | |

FOREIGN PATENT DOCUMENTS

| | | | | |
|---|---|---|---|---|
| EP | 3156254 | A1 * | 4/2017 | .......... B60B 25/004 |
| EP | 3521161 | | 8/2019 | |
| EP | 3712054 | | 9/2020 | |
| EP | 3647188 | B1 * | 9/2021 | ......... B60B 27/0052 |
| WO | WO-2020178017 | A1 * | 9/2020 | ............ F01N 13/00 |
| WO | WO-2021116261 | A1 * | 6/2021 | ............. B60B 21/02 |
| WO | 2022018103 | | 1/2022 | |
| WO | WO-2022018103 | A1 * | 1/2022 | ......... B60B 27/0047 |

OTHER PUBLICATIONS

European Patent Office, European Search Report dated Nov. 13, 2023 in Application No. 23179995.8.

* cited by examiner

HEAT SHIELD RETAINERS AND BUMPER STANDOFFS FOR HEAT SHIELD RETAINERS

FIELD

The present disclosure relates to wheel assemblies, and more specifically, to heat shield retainers and heat shield bumper standoffs for heat shield retainers.

BACKGROUND

Aircraft wheel and brake assemblies typically include a heat shield located between the friction disks of the heat sink and the radially inward surface of the wheel. Heat shields are generally not fastened directly to the wheel and may move radially and/or circumferentially. Movement and/or distortion of the heat shield can lead to wear on the heat shield and/or on components of the wheel (e.g., the fuse plug lug).

SUMMARY

A heat shield retainer is disclosed herein. In accordance with various embodiments, the heat shield retainer may comprise a first radially outward surface, a second radially inward surface oriented away from the first radially inward surface, a first shield groove located along a first circumferential end of the heat shield retainer, and a second shield groove located along a second circumferential end of the heat shield retainer opposite the first circumferential end. A first bumper standoff and a second bumper standoff may be located over the first radially outward surface. The first bumper standoff may include a first attachment portion coupled to the first radially outward surface and a first bumper portion defining a first bumper opening. The second bumper standoff may include a second attachment portion coupled to the first radially outward surface and a second bumper portion defining a second bumper opening.

In various embodiments, heat shield retainer may further comprise a first lower flange located at the first circumferential end of the heat shield retainer and extending in a first circumferential direction and a first upper flange located at the first circumferential end of the heat shield retainer and extending in the first circumferential direction. The first lower flange and the first upper flange may define, at least, a portion of the first shield groove. A second lower flange may be located at the second circumferential end of the heat shield retainer and may extend in a second circumferential direction opposite the first circumferential direction. A second upper flange may be located at the second circumferential end of the heat shield retainer and may extend in the second circumferential direction. The second lower flange and the second upper flange may define, at least, a portion of the second shield groove.

In various embodiments, the first bumper standoff may further comprise: a first sidewall extending from the first bumper portion to a first flange of the first attachment portion, and a second sidewall extending from the first bumper portion to a second flange of the first attachment portion.

In various embodiments, the first bumper portion may comprise a rectangular shape. In various embodiments, the first sidewall may be approximately normal to the first flange, and the second sidewall may be approximately normal to the second flange.

In various embodiments, the first bumper portion of the first bumper standoff and the second bumper portion of the second bumper standoff may each comprise a conical shape. In various embodiments, a first retainer bumper may be located in the first bumper opening, and a second retainer bumper may be located in the second bumper opening.

A heat shield for a wheel assembly is also disclosed herein. In accordance with various embodiments, the heat shield may comprise a plurality of heat shield segments, a plurality of shield bumpers coupled to a radially outward surface of each heat shield segment of the plurality of heat shield segments, and a plurality of heat shield retainers coupled to the plurality of heat shield segments. Each heat shield retainer of the plurality of heat shield retainers may be coupled to a pair of circumferentially adjacent heat shield segments of the plurality of heat shield segments. Each heat shield retainer of the plurality of heat shield retainers may include a first bumper standoff and a second bumper standoff located over a first radially outward surface of the heat shield retainer. Each of the first bumper standoff and the second bumper standoff may comprise an attachment portion coupled to the first radially outward surface of the heat shield retainer and a bumper portion defining a bumper opening.

In various embodiments, each heat shield retainer of the plurality of heat shield retainers may further comprise a first retainer bumper located in the bumper opening of the first bumper standoff, and a second retainer bumper located the bumper opening of the second bumper standoff.

In various embodiments, each of the first bumper standoff and the second bumper standoff may further comprise a first sidewall extending from the bumper portion to a first flange of the attachment portion, and a second sidewall extending from the bumper portion to a second flange of the attachment portion. In various embodiments, the first sidewall may be approximately normal to the first flange, and the second sidewall may be approximately normal to the second flange.

In various embodiments, the bumper portion of each of the first bumper standoff and the second bumper standoff may comprise a rectangular shape. In various embodiments, the bumper portion of each of the first bumper standoff and the second bumper standoff may comprise a conical shape.

In various embodiments, the first retainer bumper may be located closer to a first axial end of the heat shield retainer than to a second axial end of the heat shield retainer, and the second retainer bumper may be located closer to a midline of the heat shield retainer than to the second axial end of the heat shield retainer, where the midline is halfway between the first axial end of the heat shield retainer and the second axial end of the heat shield retainer.

A wheel assembly is also disclosed herein. In accordance with various embodiments, the wheel assembly may comprise a wheel and a heat shield located radially inward of an inner circumferential surface of the wheel. The heat shield may comprise a plurality of heat shield segments, a plurality of shield bumpers coupled to a radially outward surface of each heat shield segment of the plurality of heat shield segments, and a plurality of heat shield retainers coupled to the plurality of heat shield segments. Each heat shield retainer of the plurality of heat shield retainers may be coupled to a pair of circumferentially adjacent heat shield segments of the plurality of heat shield segments. Each heat shield retainer of the plurality of heat shield retainers may include a first bumper standoff and a second bumper standoff located over a first radially outward surface of the heat shield retainer. Each of the first bumper standoff and the second bumper standoff may comprise an attachment portion coupled to the first radially outward surface of the heat shield retainer and a bumper portion defining a bumper opening.

In various embodiments, each heat shield retainer of the plurality of heat shield retainers may further comprise a first retainer bumper located in the bumper opening of the first bumper standoff, and a second retainer bumper located the bumper opening of the second bumper standoff.

In various embodiments, each of the first bumper standoff and the second bumper standoff may further comprise a first sidewall extending from the bumper portion to a first flange of the attachment portion, and a second sidewall extending from the bumper portion to a second flange of the attachment portion.

In various embodiments, the bumper portion of each of the first bumper standoff and the second bumper standoff may comprise a rectangular shape. In various embodiments, the bumper portion of each of the first bumper standoff and the second bumper standoff may comprise a conical shape.

In various embodiments, the first retainer bumper may be located closer to a first axial end of the heat shield retainer than to a second axial end of the heat shield retainer, and the second retainer bumper may be located closer to a fuse plug lug of the wheel than to the second axial end of the heat shield retainer.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
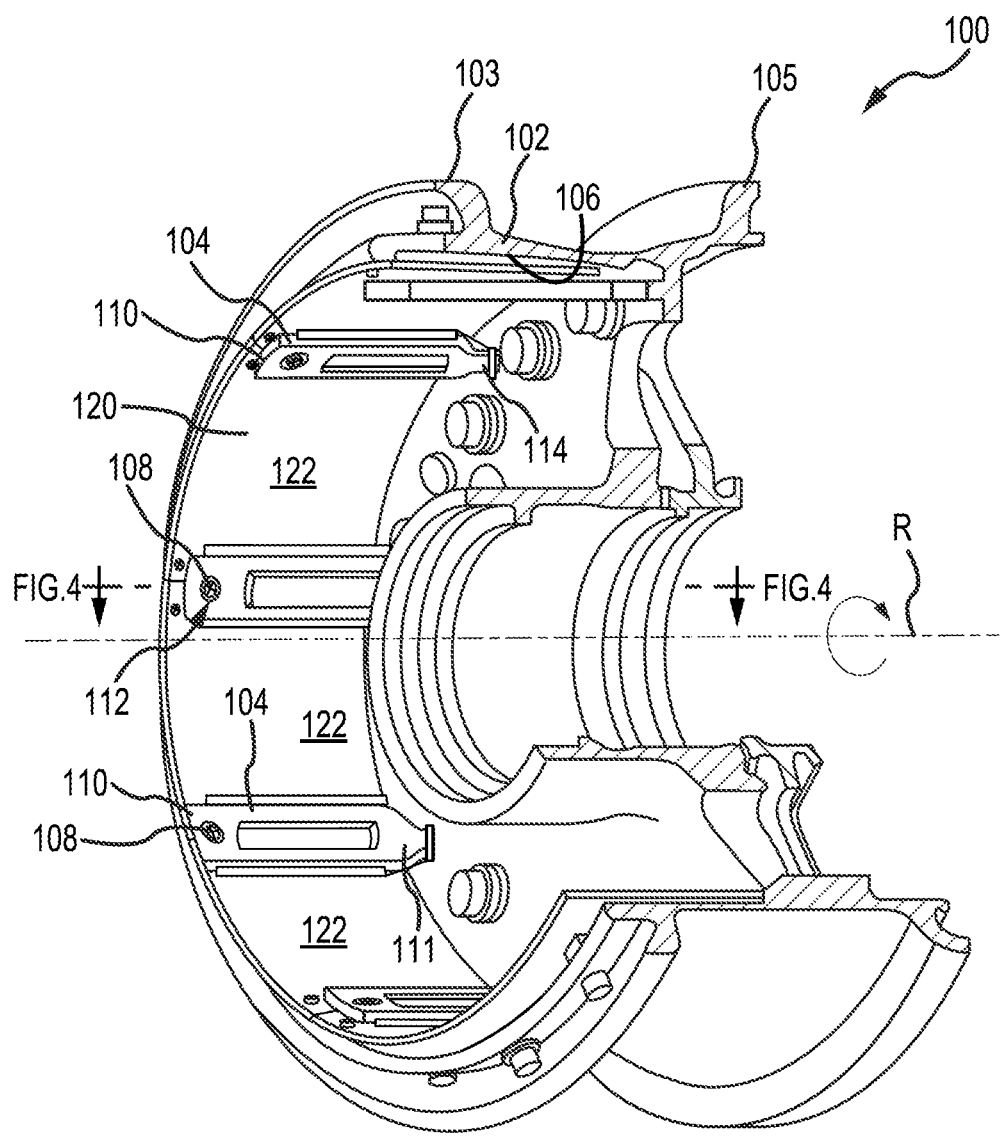
FIG. 1 illustrates a perspective partial cut-away view of a wheel assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Surface shading and cross hatching may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

A first component that is "radially outward" of a second component means that the first component is positioned a greater distance away from a common axis of the first component and the second component as compared to the second component. A first component that is "radially inward" of a second component means that the first component is positioned closer to the common axis of the first and second components than the second component.

With reference to FIG. 1, a wheel assembly 100 is illustrated. In accordance with various embodiments, wheel assembly 100 includes a wheel 102 and a plurality of torque bars 104. Torque bars 104 may be located circumferentially along an inner circumferential surface 106 of wheel 102. Inner circumferential surface 106 is oriented radially inward and toward an axis of rotation R of wheel 102. As used herein, the term "axial" refers to directions parallel to axis of rotation R, the term "radial" refers to directions perpendicular to axis of rotation R, and the term "circumferential" refers to directions about axis of rotation R. Wheel 102 may be configured to support a tire between an inboard rim 103 and an outboard rim 105 of wheel 102

Torque bars 104 may be coupled to wheel 102 via a fastener 108. Fastener 108 may comprise a bolt, screw, rivet, pin, clip, or any other suitable securement mechanism. Torque bars 104 may be oriented parallel to axis of rotation R of wheel 102. Torque bars 104 are configured to engage a brake assembly, which may be operably coupled to wheel 102 and configured to slow and/or stop rotation of wheel 102 about axis of rotation R.

Each torque bar 104 includes a first end 110 and a second end 111. Second end 111 is axially opposite the first end 110. Torque bar 104 may define a fastener opening 112 proximate first end 110. Fastener 108 may extend through fastener opening 112. A pin 114 of torque bar 104 is located at, and extends axially from, second end 111. Pin 114 is configured to be received within a pin opening 118 (FIG. 4) defined by wheel 102.

In accordance with various, wheel assembly 100 includes a heat shield 120. Heat shield 120 is located radially inward of wheel 102. Torque bars 104 are located radially inward of heat shield 120. In this regard, heat shield 120 may be located between torque bars 104 and inner circumferential surface 106 of wheel 102. Heat shield 120 may protect wheel 102 from heat generated during brake (e.g., heat generated by the friction disks of a braking assembly operably attached to wheel 102).

Figure 2:
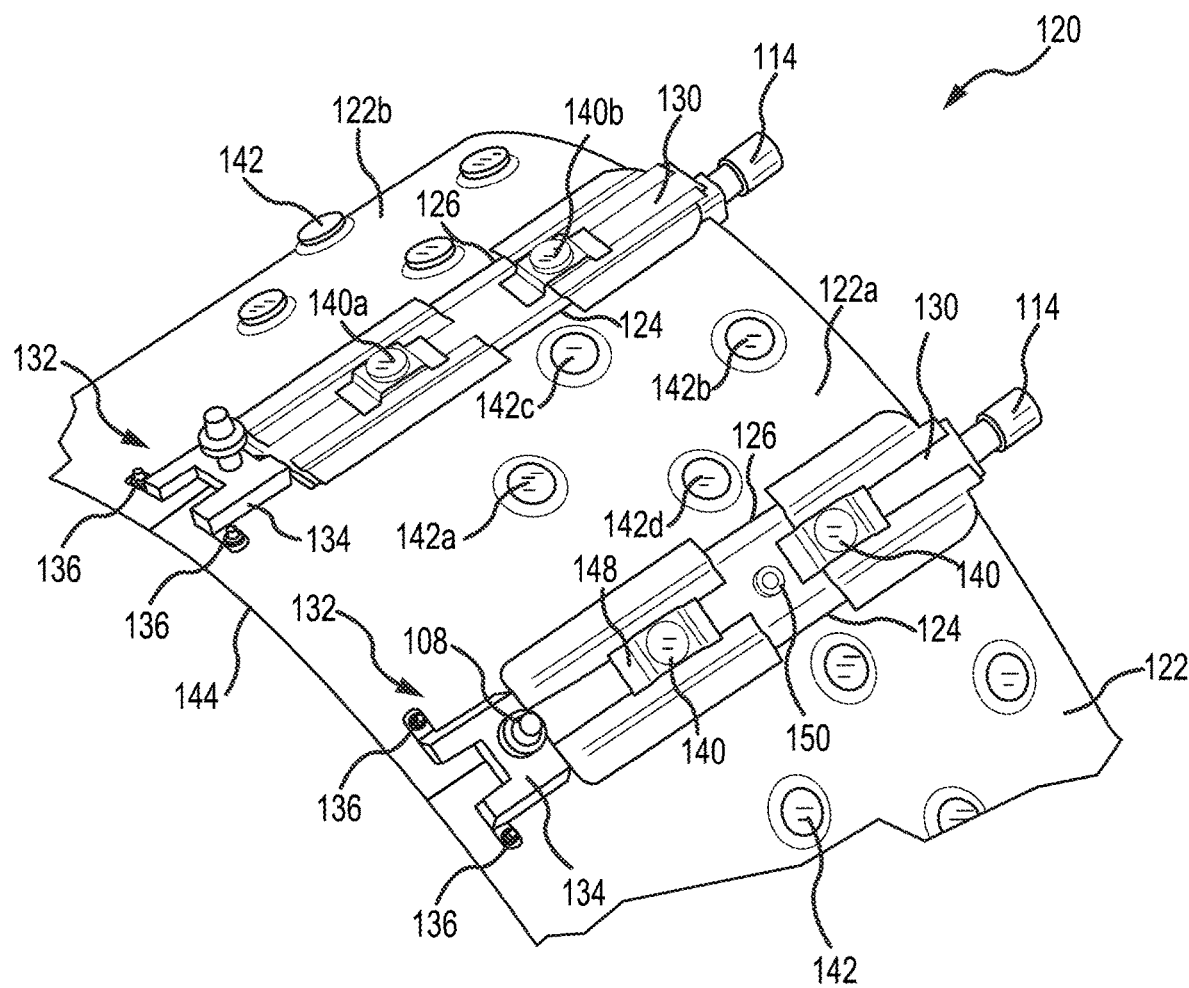
FIG. 2 illustrates a perspective view a wheel assembly heat shield, in accordance with various embodiments.

With reference to FIG. 2, additional details of heat shield 120 are illustrated, in accordance with various embodiments. Heat shield 120 comprises a plurality of heat shield segments 122. Each heat shield segment 122 may have an arcuate shape, such that together the heat shield segments 122 form the generally annual shape of heat shield 120.

Heat shield 120 further includes a plurality of heat shield retainers 130. Each heat shield retainer 130 is located between a pair of adjacent heat shield segments 122. Each heat shield retainer 130 is configured to receive and/or be coupled to circumferentially adjacent heat shield segments 122. Each heat shield segment 122 may include a first circumferential edge 124 (i.e., an edge extending in the axial direction) and a second circumferential edge 126 opposite the first circumferential edge 124. Each heat shield retainer 130 may be configured to receive the first circumferential edge 124 of a first heat shield segment 122a and the second circumferential edge 126 of a second heat shield segment 122b, which is circumferentially adjacent to the first circumferential edge 124 of the first heat shield segment 122a. In various embodiments, each heat shield retainer 130 is radially aligned (i.e., radially overlaps) with a torque bar 104.

In various embodiments, heat shield 120 may further include a plurality of torque bar spacer assemblies 132. Each torque bar spacer assembly 132 is coupled to a pair of circumferentially adjacent heat shield segments 122. Torque bar spacer assembly 132 may include a torque bar spacer 134 and two or more fasteners 136. A first fastener 136 of torque bar spacer assembly 132 couples torque bar spacer 134 to the first heat shield segment 122a of the pair of circumferentially adjacent heat shield segments 122. A second fastener 136 of torque bar spacer assembly 132 couples torque bar spacer 134 to the second heat shield segment 122b of the pair of circumferentially adjacent heat shield segments 122. In various embodiments, the fastener 108 that couples torque bar 104 to the wheel 102 (FIG. 1) may extend through torque bar spacer 134.

In accordance with various embodiments, each heat shield retainer 130 includes one or more retainer bumpers 140, and each heat shield segment 122 includes one or more shield bumpers 142. Stated differently, retainer bumpers 140 are coupled to heat shield retainers 130, and shield bumpers 142 are coupled to heat shield segments 122. Retainer bumpers 140 and shield bumpers 142 extend radially outward from the outer circumferential surface of heat shield 120. With combined reference to FIG. 1 and FIG. 2, retainer bumpers 140 and shield bumpers 142 may contact inner circumferential surface 106 of wheel 102. Retainer bumpers 140 and shield bumpers 142 may maintain a preselected radial distance between heat shield 120 and inner circumferential surface 106 of wheel 102. In this regard, retainer bumpers 140 and shield bumpers 142 tend to prevent, or reduce, occurrences of heat shield 120 physically contacting wheel 102 and/or tend to decrease deflection of heat shield 120, thereby helping to maintain the diameter and/or shape of heat shield 120.

With particular reference to FIG. 2, in various embodiments, each heat shield segment 122 may include four (4) shield bumpers 142, such as first shield bumper 142a, second shield bumper 142b, third shield bumper 142c, and fourth shield bumper 142d. In various embodiments, each heat shield retainer 130 may include two (2) retainer bumpers 140, such as first (or inboard) retainer bumper 140a and second (or outboard) retainer bumper 140b. In various embodiments, shield bumpers 142 may be arranged in a "diamond" pattern. In this regard, first shield bumper 142a may be axially aligned with second shield bumper 142b, third shield bumper 142c may be circumferentially aligned with fourth shield bumper 142d, third and fourth shield bumpers 142c, 142d may be located axially between first shield bumper 142a and second shield bumper 142b, and first and second shield bumpers 142a, 142b may be located circumferentially between third shield bumper 142c and fourth shield bumper 142d.

In various embodiments, first shield bumper 142a is circumferentially aligned with first retainer bumper 140a. As used herein, "circumferentially aligned" means first shield bumper 142a and first retainer bumper 140a are about equal distance from an axial end 144 of heat shield 120. As used in the previous context only "about" means±5% of the distance from axial end 144. With combined reference to FIG. 2 and FIG. 3, in various embodiments, the locations of first shield bumper 142a and first retainer bumper 140a correspond to a portion of inner circumferential surface 106 having the smallest diameter. For example, inner circumferential surface 106 may include curvatures such that various annular portions/areas of inner circumferential surface 106 are spaced at different distances from axis of rotation R. The first shield bumper 142a and first retainer bumper 140a are radially aligned with, and are configured to contact, the radially-inward-most portion of inner circumferential surface 106. Aligning first shield bumper 142a and first retainer bumper 140a with the radially-inward-most portion of inner circumferential surface 106 tends to reduce, or prevent, deflection of heat shield segments 122 and heat shield retainers 130 while reducing, or minimizing, the size and weight of first shield bumper 142a and first retainer bumper 140a and/or the size of the bumper standoffs 148, discussed in further detail below.

With particular reference to FIG. 2, in various embodiments, third and fourth shield bumpers 142c, 142d are circumferentially aligned with a fuse plug 150. Fuse plug 150 may be configured to release air from a tire attached to wheel 102 (FIG. 1) in response to an overheating of wheel assembly 100.

Figure 3:
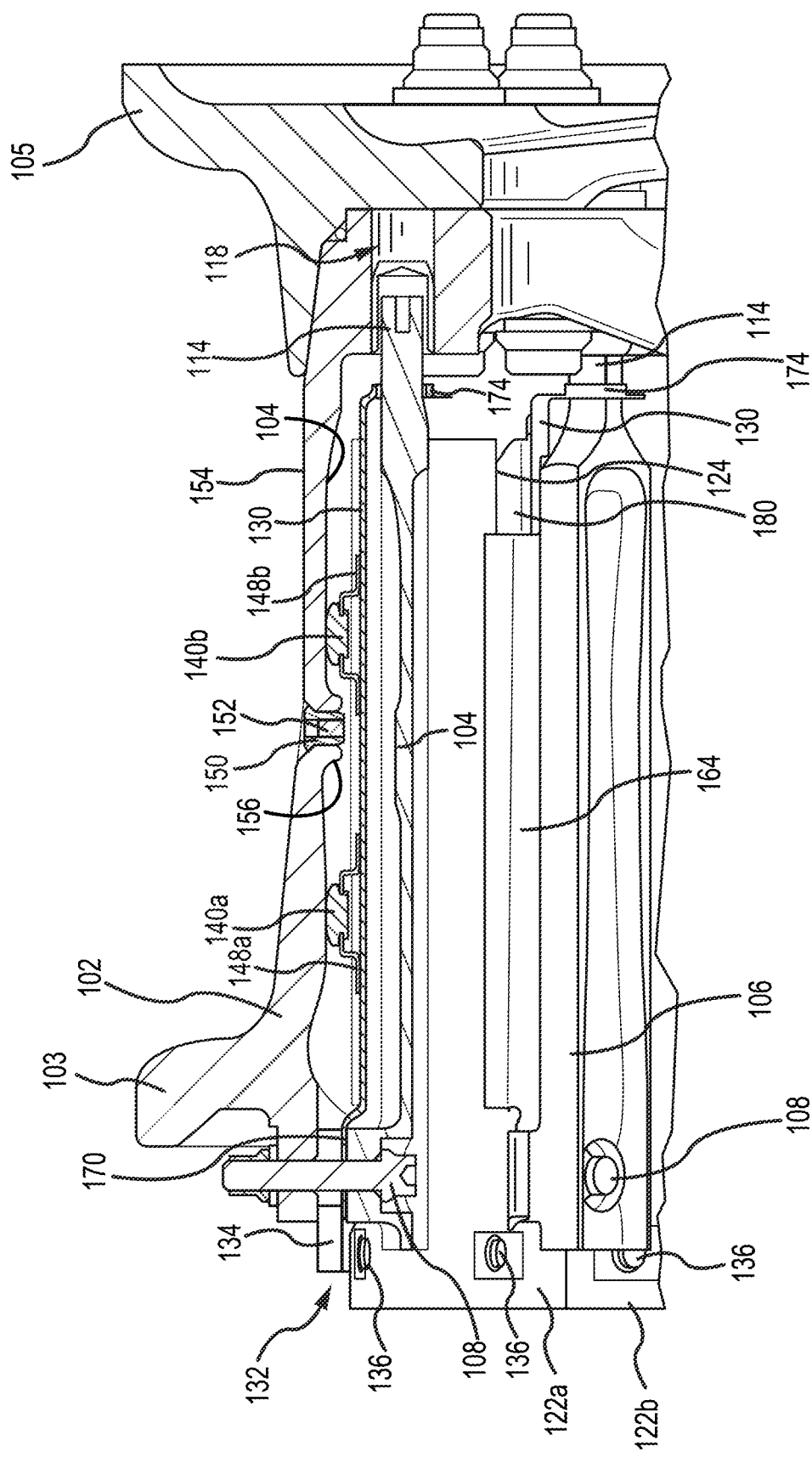
FIG. 3 illustrates a cross-section view of a wheel assembly, taken along the line FIG. 4-FIG. 4 in FIG. 1, in accordance with various embodiments.

Referring to FIG. 3, a cross-section view of wheel assembly 100, taken along FIG. 4-FIG. 4 in FIG. 1, is illustrated in accordance with various embodiments. In various embodiments, fuse plug 150 may include a eutectic 152 configured to melt at a threshold temperature. The eutectic 152 is configured to melt and flow out fuse plug 150, in response to a temperature equal to or greater than the threshold temperature, thereby creating an open fluid path to the tire located over an outer circumferential surface 154 of wheel 102. The open fluid path allows air to flow out from the tire, thereby reducing the pressure of the tire. Fuse plug 150 is located in a fuse plug lug 156 of wheel 102. Fuse plug lug 156 extends radially inward from inner circumferential surface 106 of wheel 102.

Returning to FIG. 2, circumferentially aligning third and fourth shield bumpers 142c, 142d with fuse plug 150 and fuse plug lug 156 tends to prevent, or reduce, deflection of the portions of heat shield segments 122 proximate fuse plug 150, thereby maintaining the space between fuse plug 150 and heat shield retainers 130. Maintaining space between fuse plug 150 and heat shield retainers 130 helps to ensure that eutectic 152 (FIG. 3) and fluid from the tire will be able to flow out fuse plug 150. In other words, maintaining space between fuse plug 150 and heat shield retainers 130 reduces the probability of heat shield retainer 130 blocking, or otherwise hindering, the flow of eutectic 152 (FIG. 3) and/or air through fuse plug 150. In accordance with various embodiments, the diamond configuration of shield bumpers 142 tends to prevent, or reduce, deflection of heat shield 120, while minimizing and/or reducing the number of shield bumpers 142 per heat shield segment 122. Reducing the number of shield bumpers 142 decreases the weight the of heat shield 120 and/or the costs associated with installing and/or repairing/replacing the shield bumpers 142.

Figure 4A:
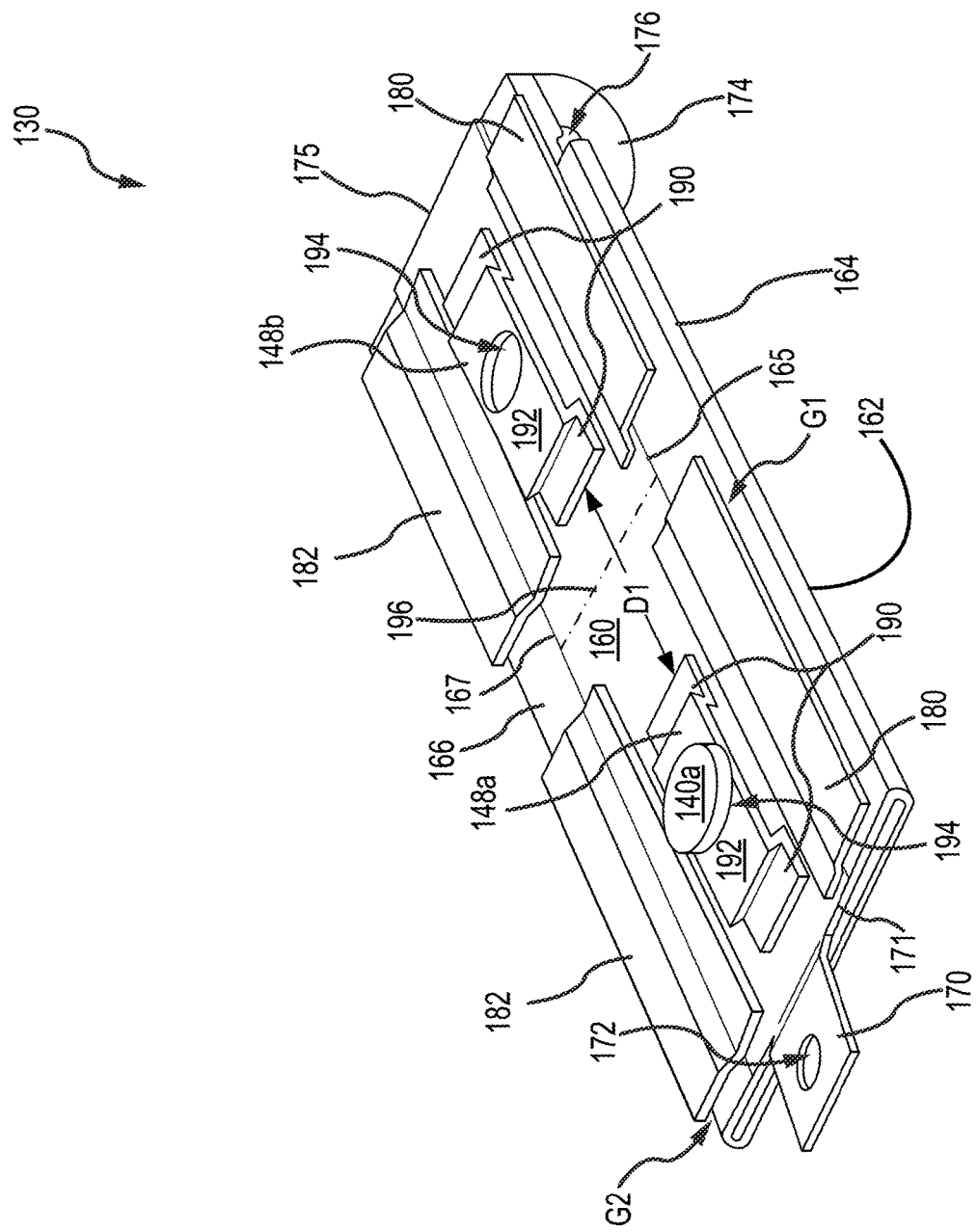
FIGS. 4A and 4B illustrate perspective views of a heat shield retainer, in accordance with various embodiments.
Figure 4B:
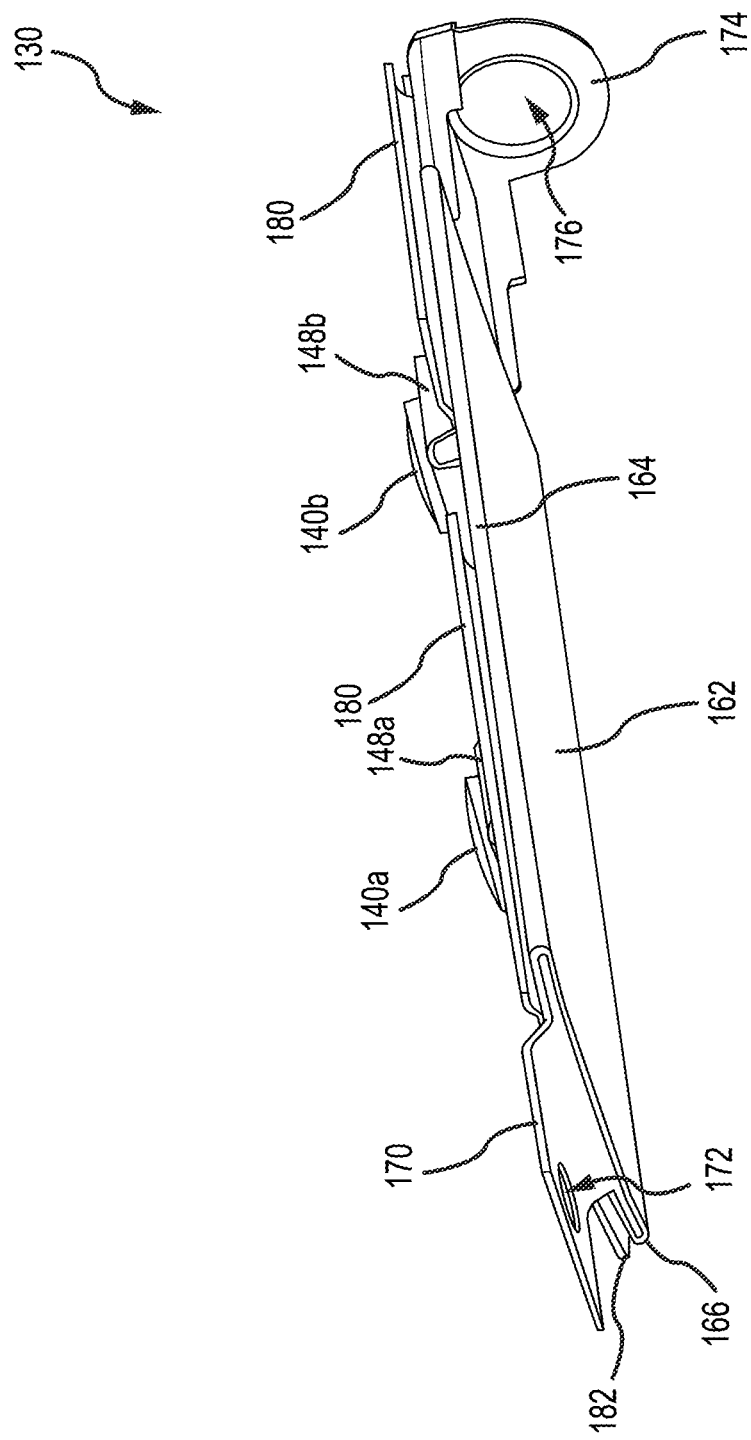

Referring to FIGS. 4A and 4B, a heat shield retainer 130 is illustrated, in accordance with various embodiments. Heat shield retainer 130 includes a first radially outward surface 160 and a second radially inward surface 162. Second radially inward surface 162 is opposite and oriented away from first radially outward surface 160. Heat shield retainer 130 includes a first lower flange 164 located at a first circumferential side 165 of heat shield retainer 130, and a second lower flange 166 located at a second circumferential side 167 of heat shield retainer 130. First and second lower flanges 164, 166 extend away from one another and in opposite circumferential directions. In this regard, first lower flange 164 extends away from second lower flange 166 in a first circumferential direction, and second lower flange 166 extends away from first lower flange 164 in a second circumferential direction that is opposite the first circumferential direction.

Heat shield retainer 130 includes a fastener flange 170 located at a first axial end 171 of heat shield retainer 130. Fastener flange 170 extends axially from first axial end 171 and defines a fastener opening 172. Fastener 108 (FIG. 3) may be located through fastener opening 172. Heat shield retainer 130 further includes tip flange 174 located at a second axial end 175 of heat shield retainer 130. Second axial end 175 is opposite first axial end 171. Tip flange 174 extends radially inward from second axial end 175 and defines a pin opening 176, configured to receive pin 114 (FIG. 3) of torque bar 104. In this regard, pin 114 may be located through pin opening 176.

Heat shield retainer 130 further includes one or more first upper flange(s) 180 located at first circumferential side 165 of heat shield retainer 130, and one or more second upper flange(s) 182 located at second circumferential side 167 of heat shield retainer 130. First and second upper flanges 180, 182 may be coupled to first radially outward surface 160. First upper flange(s) and second upper flange(s) 182 extend away from one another and in opposite circumferential directions. In this regard, first upper flange(s) 180 extend away from second upper flange(s) 182 in the first circumferential direction, and second upper flange(s) 182 extend away from first upper flange(s) 180 in the second circumferential direction.

First upper flange(s) 180 is/are radially outward of first lower flange 164 and is/are spaced apart from first lower flange 164, such that a first gap G1 is formed between first upper flange(s) 180 and first lower flange 164. Stated differently, first gap G1 is defined by a radially inward surface of first upper flange(s) 180 and a radially outward surface of first lower flange 164. Second upper flange(s) 182 is/are radially outward of second lower flange 166 and is/are spaced apart from second lower flange 166, such that a second gap G2 is formed between second upper flange(s) 182 and second lower flange 166. Stated differently, second gap G2 is defined by a radially inward surface of second upper flange(s) 182 and a radially outward surface of second lower flange 166.

With combined reference to FIG. 2 and FIGS. 4A and 4B, first gap G1 is configured to receive the first circumferential edge 124 of a first heat shield segment 122a and second gap G2 is configured to receive the second circumferential edge 126 of a second circumferentially adjacent heat shield segment 122b. Stated differently, the first circumferential edge 124 of a first heat shield segment 122a of a pair of circumferentially adjacent heat shield segments 122 may be located in first gap G1 and the second circumferential edge 126 of a second heat shield segment 122b of the pair of circumferentially adjacent heat shield segments 122 may be located in second gap G2 (i.e., the first circumferential edge 124 is located between the radially inward surface of first upper flange(s) 180 and the radially outward surface of first lower flange 164, and the second circumferential edge 126 is located between the radially inward surface of second upper flange(s) 182 and the radially outward surface of second lower flange 166).

In accordance with various embodiments, a first (or inboard) bumper standoff 148a is located over first radially outward surface 160. In various embodiments, a second (or outboard) bumper standoff 148a is located over first radially outward surface 160. First and second bumper standoffs 148a, 148b each include an attachment portion 190 and bumper portion 192. Attachment portion 190 is coupled to and may contact first radially outward surface 160. For example, attachment portion may include one or more flanges attached to first radially outward surface 160. Attachment portion 190 may be coupled to first radially outward surface 160 via welding, adhesive, fastener(s), or any other suitable attachment means. Bumper portion 192 is radially outward of attachment portion 190 and is spaced apart from first radially outward surface 160. Each bumper portion 192 defines a bumper opening 194 configured to receive a retainer bumper 140. In FIG. 4A, second retainer bumper 140b is removed from second bumper standoff 148b to better illustrate bumper opening 194.

First bumper standoff 148a is axially spaced apart from second bumper standoff 148b by a distance D1. Distance D1 is selected such that first bumper standoff 148a and second bumper standoff 148b are spaced apart from fuse plug 150 and fuse plug lug 156, with momentary reference to FIG. 3. State differently, first bumper standoff 148a and second bumper standoff 148b are radially offset from fuse plug 150 and fuse plug lug 156 (i.e., first bumper standoff 148a and second bumper standoff 148b do not overlap fuse plug 150 and fuse plug lug 156 in the radial direction).

In accordance with various embodiments, first retainer bumper 140a (and thus the bumper opening 194 in which first retainer bumper 140a is located) is located closer to first axial end 171 than to second axial end 175 of heat shield retainer 130. Second retainer bumper 140b (and thus the bumper opening 194 in which second retainer bumper 140b is located) is located closer to second axial end 175 than to first axial end 171 of heat shield retainer 130. In various embodiments, second retainer bumper 140b (and thus the bumper opening 194 in which second retainer bumper 140b is located) may be located as close as possible to fuse plug 150 and fuse plug lug 156 without causing second bumper standoff 148b to overlap fuse plug 150 or fuse plug lug 156. In this regard, second retainer bumper 140b (and thus the bumper opening 194 in which second retainer bumper 140b is located) may be located closer to fuse plug 150 and fuse plug lug 156 than to second axial end 175. In various embodiments, second retainer bumper 140b (and thus the bumper opening 194 in which second retainer bumper 140b is located) may be located closer to an imaginary midline 196 of heat shield retainers 130 than to second axial end 175, where the imaginary midline 196 of heat shield retainers 130 is located halfway between first axial end 171 and second axial end 175. In various embodiments, heat shield retainers 130 may experience the greatest deflection or bending moment proximate fuse plug 150 and fuse plug lug 156. Locating second retainer bumper 140b proximate fuse plug 150 and fuse plug lug 156, without radially overlapping, tends to reduce or minimize deflection, while avoiding blockage of the fluid path of the eutectic 152 and the air from the tire.

Figure 5A:
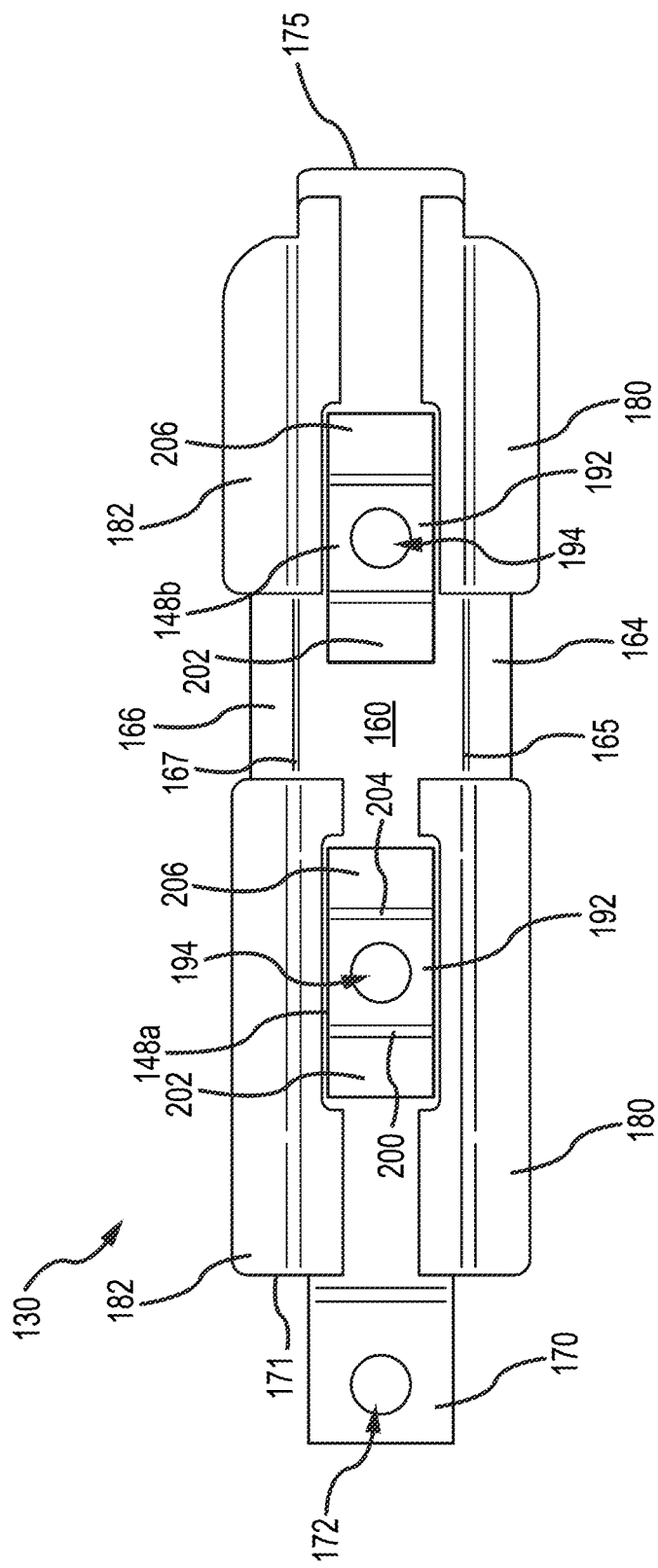
FIG. 5A illustrates a plan view of a heat shield retainer having flat bumper standoffs, in accordance with various embodiments.

With reference to FIG. 5A, in various embodiments, each of first bumper standoff 148a and second bumper standoff 148*b* may be flat bumper standoffs. In this regard, bumper portion 192 of each of first bumper standoff 148*a* and second bumper standoff 148*b* may have a generally square or rectangular shape. Each of first bumper standoff 148*a* and second bumper standoff 148*b* may include bumper portion 192, a first sidewall 200 extending from bumper portion 192 to a first flange 202 of attachment portion 190, and a second sidewall 204 extending from bumper portion 192 to a second flange 206 of attachment portion 190. Each of first flange 202 and second flange 206 may be coupled to first radially outward surface 160 via welding, adhesive, fastener(s), or any other suitable attachment means. In various embodiments, first sidewall 200 is approximately normal to first flange 202, and second sidewall 204 is approximately normal to second flange 206. As used in the previous context only, "approximately" means±5°. A radially inward surface of bumper portion 192 is spaced apart from first radially outward surface 160 of heat shield retainer 130.

Figure 5B:
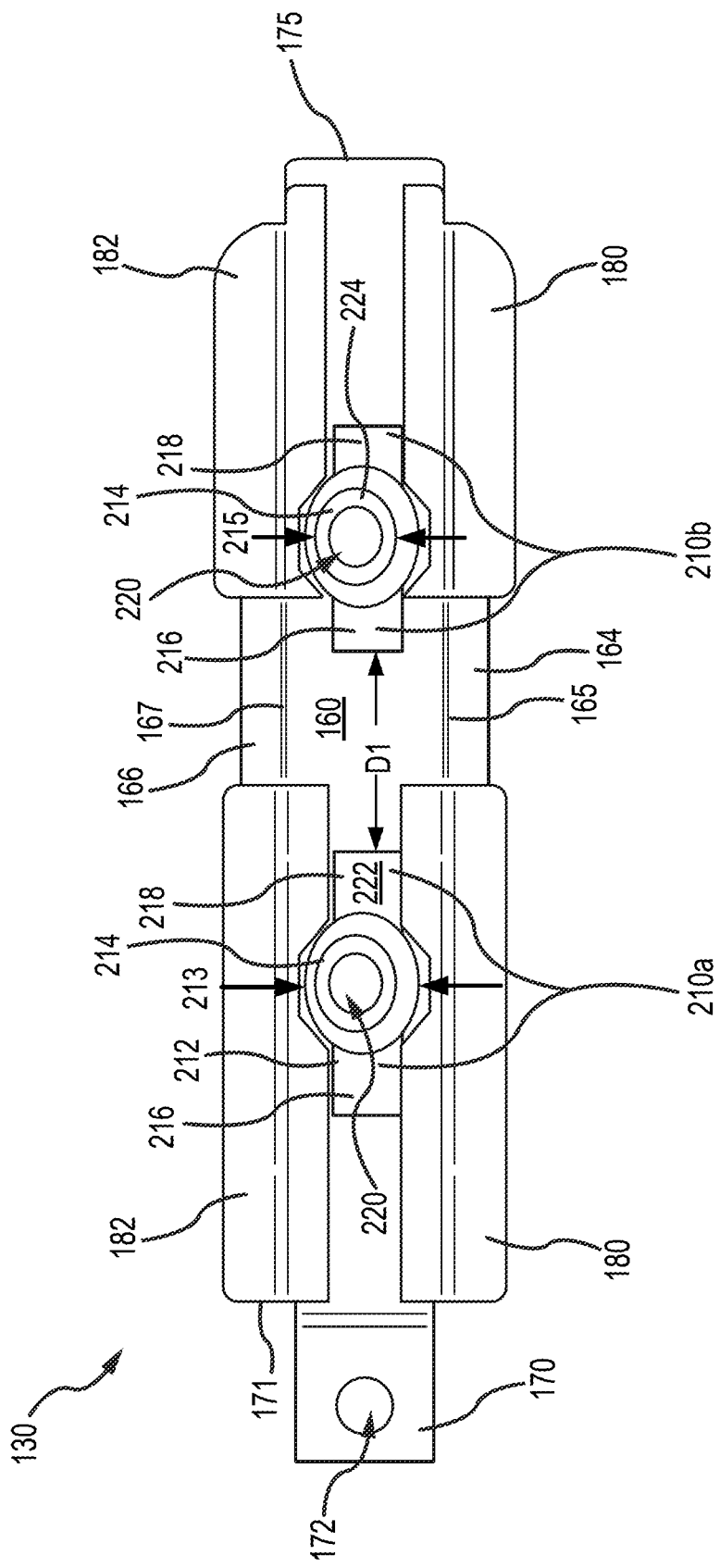
FIG. 5B illustrates a plan view of a heat shield retainer having conical bumper standoffs, in accordance with various embodiments.

With reference to FIG. 5B, in various embodiments, heat shield retainer 130 may include one or more conically shaped bumper standoffs, such as first bumper standoff 210*a* and second bumper standoff 210*b*, located over first radially outward surface 160. First (or inboard) bumper standoff 210*a* is axially spaced apart from second (or outboard) bumper standoff 210*b* by distance D1. In this regard, first bumper standoff 210*a* and second bumper standoff 210*b* are radially offset from fuse plug 150 and fuse plug lug 156 (FIG. 3) (i.e., neither first bumper standoff 210*a* nor second bumper standoff 148*b* radially overlaps fuse plug 150 or fuse plug lug 156).

In accordance with various embodiments, first and second bumper standoffs 210*a*, 210*b* each include an attachment portion 212 and a bumper portion 214. Attachment portion 212 is coupled to and may contact first radially outward surface 160. For example, attachment portion 212 may include a first flange 216 and a second flange 218 attached to first radially outward surface 160. First and second flanges 216, 218 may be coupled to first radially outward surface 160 via welding, adhesive, fastener(s), or any other suitable attachment means. Each bumper portion 214 defines a bumper opening 220 configured to receive a retainer bumper 140, e.g., as shown in FIG. 2, similar to bumper openings 194 in FIG. 4A. Bumper portion 214 may have a conical shape. In this regard, a diameter of bumper portion 214 may decrease in the radially outward direction. Stated differently, a first diameter 213 of bumper portion 214 is greater than a second diameter 215 of bumper portion 214, where the first diameter 213 is measured at attachment portion 212 (e.g., at the radially outward surface 222 of either of first and second flanges 216, 218, and the second diameter is measured at radially outward surface 224 of bumper portion 214. Radially outward surface 224 may be approximately parallel to radially outward surface 222. As used in the previous context only, "approximately" means±5°. Radially outward surface 224 defines bumper opening 220.

In accordance with various embodiments, the bumper opening 220 in first bumper standoff 210*a* is located closer to first axial end 171 than to second axial end 175 of heat shield retainer 130. The bumper opening 220 in second bumper standoff 210*b* is located closer to second axial end 175 than to first axial end 171 of heat shield retainer 130. In various embodiments, the bumper opening 220 in second bumper standoff 210*b* may be located as close as possible to fuse plug 150 and fuse plug lug 156 (FIG. 3) without causing second bumper standoff 210*b* to overlap fuse plug 150 or fuse plug lug 156. In this regard, the retainer bumper 140*b* located in second bumper standoff 210*b* may be located closer to fuse plug 150 and fuse plug lug 156 than to second axial end 175. In various embodiments, the retainer bumper 140 and the bumper opening 220 in second bumper standoff 210*b* are located closer to imaginary midline 196 than to second axial end 175.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield retainer, comprising:
   a first radially outward surface;
   a second radially inward surface oriented away from the first radially outward surface;
   a first shield groove located along a first circumferential end of the heat shield retainer;
   a second shield groove located along a second circumferential end of the heat shield retainer opposite the first circumferential end;
   a first bumper standoff located over the first radially outward surface, the first bumper standoff including a first attachment portion coupled to the first radially outward surface, a first bumper portion spaced apart from the first radially outward surface, and a first bumper opening disposed in the first bumper portion; and
   a second bumper standoff located over the first radially outward surface, the second bumper standoff including a second attachment portion coupled to the first radially outward surface, a second bumper portion spaced apart from the first radially outward surface, and a second bumper opening disposed in the second bumper portion.

2. The heat shield retainer of claim 1, further including:
   a first lower flange located at the first circumferential end of the heat shield retainer and extending in a first circumferential direction;
   a first upper flange located at the first circumferential end of the heat shield retainer and extending in the first circumferential direction, the first lower flange and the first upper flange defining, at least, a portion of the first shield groove;
   a second lower flange located at the second circumferential end of the heat shield retainer and extending in a second circumferential direction opposite the first circumferential direction; and
   a second upper flange located at the second circumferential end of the heat shield retainer and extending in the second circumferential direction, the second lower flange and the second upper flange defining, at least, a portion of the second shield groove.

3. The heat shield retainer of claim 2, the first bumper standoff further comprises:
   a first sidewall extending from the first bumper portion to a first flange of the first attachment portion; and
   a second sidewall extending from the first bumper portion to a second flange of the first attachment portion.

4. The heat shield retainer of claim 3, wherein the first bumper portion comprises a rectangular shape.

5. The heat shield retainer of claim 4, wherein the first sidewall is normal to the first flange, and wherein the second sidewall is normal to the second flange.

6. The heat shield retainer of claim 5, wherein the first bumper portion of the first bumper standoff and the second bumper portion of the second bumper standoff each comprises a conical shape.

7. The heat shield retainer of claim 1, further comprising:
   a first retainer bumper located in the first bumper opening; and
   a second retainer bumper located in the second bumper opening.

8. A heat shield for a wheel assembly, the heat shield comprising:
   a plurality of heat shield segments;
   a plurality of shield bumpers coupled to a radially outward surface of each heat shield segment of the plurality of heat shield segments; and
   a plurality of heat shield retainers coupled to the plurality of heat shield segments, each heat shield retainer of the plurality of heat shield retainers being coupled to a pair of circumferentially adjacent heat shield segments of the plurality of heat shield segments, wherein each heat shield retainer of the plurality of heat shield retainers includes a first bumper standoff and a second bumper standoff located over a first radially outward surface of the heat shield retainer, and wherein each of the first bumper standoff and the second bumper standoff comprises an attachment portion coupled to the first radially outward surface of the heat shield retainer, a bumper portion spaced apart from the first radially outward surface, and a bumper opening disposed in the bumper portion.

9. The heat shield of claim 8, wherein each heat shield retainer of the plurality of heat shield retainers further comprises:
   a first retainer bumper located in the bumper opening of the first bumper standoff; and
   a second retainer bumper located in the bumper opening of the second bumper standoff.

10. The heat shield of claim 9, wherein each of the first bumper standoff and the second bumper standoff further comprises:
    a first sidewall extending from the bumper portion to a first flange of the attachment portion; and
    a second sidewall extending from the bumper portion to a second flange of the attachment portion.

11. The heat shield of claim 10, wherein the first sidewall is approximately normal to the first flange, and wherein the second sidewall is approximately normal to the second flange.

12. The heat shield of claim 10, wherein the bumper portion of each of the first bumper standoff and the second bumper standoff comprises a rectangular shape.

13. The heat shield of claim 9, wherein the bumper portion of each of the first bumper standoff and the second bumper standoff comprises a conical shape.

14. The heat shield of claim 9, wherein the first retainer bumper is located closer to a first axial end of the heat shield retainer than to a second axial end of the heat shield retainer, and wherein the second retainer bumper is located closer to a midline of the heat shield retainer than to the second axial end of the heat shield retainer, the midline being halfway between the first axial end of the heat shield retainer and the second axial end of the heat shield retainer.

15. A wheel assembly, comprising:
    a wheel; and a heat shield located radially inward of an inner circumferential surface of the wheel, the heat shield comprising:
  a plurality of heat shield segments;
  a plurality of shield bumpers coupled to a radially outward surface of each heat shield segment of the plurality of heat shield segments; and
  a plurality of heat shield retainers coupled to the plurality of heat shield segments, each heat shield retainer of the plurality of heat shield retainers being coupled to a pair of circumferentially adjacent heat shield segments of the plurality of heat shield segments, wherein each heat shield retainer of the plurality of heat shield retainers includes a first bumper standoff and a second bumper standoff located over a first radially outward surface of the heat shield retainer, and wherein each of the first bumper standoff and the second bumper standoff comprises an attachment portion coupled to the first radially outward surface of the heat shield retainer, a bumper portion spaced apart from the first radially outward surface, and a bumper opening disposed in the bumper portion.

16. The wheel assembly of claim 15, wherein each heat shield retainer of the plurality of heat shield retainers further comprises:
  a first retainer bumper located in the bumper opening of the first bumper standoff; and
  a second retainer bumper located in the bumper opening of the second bumper standoff.

17. The wheel assembly of claim 16, wherein each of the first bumper standoff and the second bumper standoff further comprises:
  a first sidewall extending from the bumper portion to a first flange of the attachment portion; and
  a second sidewall extending from the bumper portion to a second flange of the attachment portion.

18. The wheel assembly of claim 17, wherein the bumper portion of each of the first bumper standoff and the second bumper standoff comprises a rectangular shape.

19. The heat shield of claim 16, wherein the bumper portion of each of the first bumper standoff and the second bumper standoff comprises a conical shape.

20. The wheel assembly of claim 16, wherein the first retainer bumper is located closer to a first axial end of the heat shield retainer than to a second axial end of the heat shield retainer, and wherein the second retainer bumper is located closer to a fuse plug lug of the wheel than to the second axial end of the heat shield retainer.

* * * * *